United States Patent
Nitsche et al.

(10) Patent No.: US 10,040,938 B2
(45) Date of Patent: Aug. 7, 2018

(54) MOULDING COMPOUND BASED ON A PARTIALLY AROMATIC COPOLYAMIDE

(71) Applicants: Jasmin Nitsche, Dortmund (DE); Harald Haeger, Luedinghausen (DE); Sebastian Geerkens, Krefeld (DE); Franz-Erich Baumann, Duelmen (DE); Reinhard Beuth, Marl (DE)

(72) Inventors: Jasmin Nitsche, Dortmund (DE); Harald Haeger, Luedinghausen (DE); Sebastian Geerkens, Krefeld (DE); Franz-Erich Baumann, Duelmen (DE); Reinhard Beuth, Marl (DE)

(73) Assignee: EVONIK DEGUSSA GmbH, Essen (DE)

( * ) Notice: Subject to any disclaimer, the term of this patent is extended or adjusted under 35 U.S.C. 154(b) by 319 days.

(21) Appl. No.: 14/489,612

(22) Filed: Sep. 18, 2014

(65) Prior Publication Data
US 2015/0086737 A1     Mar. 26, 2015

(30) Foreign Application Priority Data

Sep. 20, 2013  (DE) ........................ 10 2013 218 957

(51) Int. Cl.
| | | |
|---|---|---|
| C08L 77/10 | (2006.01) | |
| C08L 77/06 | (2006.01) | |
| C08K 3/16 | (2006.01) | |
| C08K 5/00 | (2006.01) | |
| C08K 5/18 | (2006.01) | |

(52) U.S. Cl.
CPC ................ *C08L 77/06* (2013.01); *C08K 3/16* (2013.01); *C08K 5/005* (2013.01); *C08K 5/18* (2013.01); *C08L 2201/08* (2013.01); *C08L 2203/18* (2013.01); *Y10T 428/139* (2015.01); *Y10T 428/1352* (2015.01); *Y10T 428/1393* (2015.01); *Y10T 428/1397* (2015.01)

(58) Field of Classification Search
CPC ................................. C08L 77/00; C08L 77/10
USPC ...... 524/607; 525/178, 64, 66, 71; 428/34.1, 428/35.6, 35.7
See application file for complete search history.

(56) References Cited

U.S. PATENT DOCUMENTS

| | | | |
|---|---|---|---|
| 6,008,297 A * | 12/1999 | Tanaka | C08L 77/00 524/401 |
| 6,569,947 B1 | 5/2003 | Feinberg | |
| 6,579,581 B2 | 6/2003 | Bartz et al. | |
| 8,303,873 B2 | 11/2012 | Dowe et al. | |
| 8,759,437 B2 | 6/2014 | Pawlik et al. | |
| 2008/0274355 A1 | 11/2008 | Hewel | |
| 2010/0233402 A1 | 9/2010 | Doshi et al. | |
| 2011/0052848 A1 | 3/2011 | Doshi et al. | |
| 2011/0123749 A1 | 5/2011 | Hewel et al. | |
| 2012/0095161 A1 | 4/2012 | Pawlik et al. | |
| 2012/0196973 A1* | 8/2012 | Doshi | C08L 77/06 524/538 |
| 2012/0245283 A1* | 9/2012 | Desbois | C08G 69/265 524/607 |
| 2013/0115401 A1 | 5/2013 | Doshi et al. | |

FOREIGN PATENT DOCUMENTS

| | | |
|---|---|---|
| EP | 1 988 113 A1 | 11/2008 |
| EP | 2 325 260 | 5/2011 |
| EP | 2 325 260 A1 | 5/2011 |
| EP | 2 365 033 | 9/2011 |
| EP | 2 666 823 | 11/2013 |
| JP | 4-202560 A | 7/1992 |
| JP | 11-335553 | 12/1999 |
| JP | 2004346240 A | 5/2003 |
| JP | 2007-31505 A | 2/2007 |
| JP | 2007-224288 A | 9/2007 |
| JP | 2010-513626 | 4/2010 |
| JP | 2010-202724 A | 9/2010 |
| JP | 2013-514212 | 4/2013 |
| WO | WO 2005/018891 A1 | 3/2005 |
| WO | 2010/089258 | 8/2010 |

(Continued)

OTHER PUBLICATIONS

Extended Search Report dated Mar. 11, 2015 in European Patent Application No. 14185373.9 (with English translation of category of cited documents).
Angebot "Fusaband N493", May 18, 2009.
Analyseresultate "Fusaband N493", Mar. 25, 2008.
Produktdatenblatt—Exxelor va 1801, Jul. 31, 2014.
Produktdatenblatt—Exxelor va 1803, Dec. 21, 2009.
Letter Mitsui Chemicals Inc—"Tafmer MH 7010" and "Tafmer MH 7020", Jan. 31, 2017.
Analyse "Tafmer MH 7020".

*Primary Examiner* — Ellen S Wood
(74) *Attorney, Agent, or Firm* — Oblon, McClelland, Maier & Neustadt, L.L.P.

(57) ABSTRACT

A moulding composition contains at least 40 wt % of components a) and b). Based on the sum of components a) and b), there are 60-99 wt % of component a) and 40-1 wt % of component b). Component a) is a partially aromatic copolyamide containing, as polymerized monomer units, 30-90 mol % of a combination of hexamethylenediamine and terephthalic acid and 70-10 mol % of a combination of hexamethylenediamine and a linear aliphatic dicarboxylic acid having 8-19 C atoms. Component b) is an olefinic copolymer containing, as polymerized monomer units, i) 35-94.9 wt % of ethene-based monomer units, ii) 5-65 wt % of monomer units based on a 1-alkene having 4-8 C atoms, iii) 0-10 wt % of monomer units based on an olefin different from i) and ii), and iv) 0.1-2.5 wt % of monomer units based on an aliphatically unsaturated dicarboxylic acid anhydride, where the sum of wt % of i), ii), iii) and iv) is 100%.

16 Claims, No Drawings

(56) References Cited

FOREIGN PATENT DOCUMENTS

| WO | WO 2012/106309 A2 | 8/2012 |
| WO | 2012/135393 | 10/2012 |
| WO | 2013/070551 A1 | 5/2013 |
| WO | 2013/101891 | 7/2013 |

* cited by examiner

MOULDING COMPOUND BASED ON A PARTIALLY AROMATIC COPOLYAMIDE

CROSS REFERENCE TO RELATED APPLICATIONS

This application claims priority to German Application No. DE 102013218957.5 filed Sep. 20, 2013, the disclosure of which is incorporated herein by reference in it entirety.

BACKGROUND OF THE INVENTION

The subject of the invention is an impact modified polyamide moulding compound which contains a partially aromatic copolyamide and a polyolefinic impact modifier and which on the basis of the selection of the individual components has high impact strength and elongation at break and high thermal aging resistance. The moulded articles produced therefrom are also a subject of the invention.

Conventionally known polyamides such as PA6 and PA66 are easy to process and have high melting points and high thermal dimensional stability, especially if they are reinforced with glass fibres or contain mineral fillers. However, they typically have high water absorption of up to 10% on storage in water. For many applications with high requirements for dimensional stability even under moist conditions these aliphatic polyamides cannot be used. Furthermore, with the absorption of water, the mechanical properties also change; the rigidity and the strength are reduced severalfold by water absorption.

Partially aromatic polyamides have reduced water absorption compared to PA6 and PA66, and the mechanical properties are largely maintained after water absorption. In addition, they have melting points which sometimes lie markedly above that of PA66 and would therefore in principle be suitable for applications with prolonged exposure to high temperatures, for example in the engine compartment of an automobile. Since PA6T has such a high melting point that it is no longer processable, in practice copolyamides are used, for example PA6T/6I, PA6T/66 or PA6T/6, the melting point whereof has been lowered sufficiently for the polymers to be processable. With suitable composition, such copolymers are highly crystalline, have melting points in the range around about 300° C. and high rigidity; however, they are generally very brittle and have very low elongation at break.

With polyamide moulding compounds, it is generally customary to improve the toughness and elongation at break by admixture of an impact modifier. In most cases, a polyolefin rubber which has been grafted with an unsaturated dicarboxylic acid anhydride such as maleic anhydride in order to effect phase bonding of the dispersively distributed rubber to the polyamide matrix is used as the impact modifier. In particular, an ethylene-propylene rubber which contains 0.5 wt. % of grafted maleic anhydride may be used.

With moulding compounds based on partially aromatic polyamides also, efforts were made in the past to improve their toughness and elongation at break by use of an impact modifier.

EP 1 988 113 A1 describes a polyamide moulding compound based on a copolyamide 10T/6T, which is formed from the monomers 1,10-decanediamine, 1,6-hexamethylenediamine and terephthalic acid. Copolyamides have relatively high melting points in the range around 300° C.; the processing window is therefore relatively small. A range of impact modifiers which can be added are stated, with priority being given to ethylene-propylene rubber; however, differences are not discussed in detail and the retention of the mechanical properties after thermal aging is not a central theme. Our own experiments have shown that with such impact modified moulding compounds the elongation at break is low.

EP 2 325 260 A1 describes a polyamide moulding compound based on a copolyamide which is made up of 1,10-decanediamine, 1,6-hexamethylenediamine, terephthalic acid and at least one further polyamide-forming monomer. Here also, a range of impact modifiers which can be added are named, with priority being given to ethylene-propylene rubber. Here also, our own experiments have shown that with such impact modified moulding compounds the elongation at break is low.

JP 04-202560A describes that after exposure to heat, moulding compounds of a hexamethylenediamine-isophthalic acid-terephthalic acid copolymer and maleic anhydride-functionalized ethylene-1-butene rubber do not differ in their toughness and elongation at break from moulding compounds which contain other rubbers.

WO 2005/018891 and in JP 2010-202724A describe moulding compounds which contain an aromatic polyamide, a functionalized impact modifier and a copper stabilizer. Antioxidants can also be added. The moulding compounds are used for multilayer pipes.

However, the moulding compounds known from this state of the art have a number of disadvantages, in particular inadequate thermal aging resistance. Furthermore, their processing properties are poor. Their mechanical properties, in particular the impact resistance and elongation at break are so poor that their use in moulded articles such as for example pipes in the engine compartment of an automobile or under similar conditions is not advisable.

Easily processable moulding compounds are described in WO2012/106309; they contain a partially aromatic polyamide with a mainly aliphatic content and an aliphatic polyamide and a functionalized rubber. However, their thermal dimensional stability is comparable with fully aliphatic polyamides and far from adequate for demanding applications. Similar materials are described in US2013/0115401A1.

The object of the present invention was to avoid these disadvantages and in particular to provide readily processable, high melting, impact resistant moulding compounds with high elongation at break based on a partially aromatic polyamide, which essentially retain their advantageous mechanical properties even after prolonged use at high temperatures.

SUMMARY OF THE INVENTION

This and other objects have been achieved according to the present invention, the first embodiment of which includes a moulding composition, comprising at least 40 wt. % of the following components:

a) 60 to 99 parts by wt. of a partially aromatic copolyamide which comprises as polymerized monomer units:

I. 30 to 90 mol % of a combination of hexamethylenediamine and terephthalic acid; and II. 70 to 10 mol % of a combination of hexamethylenediamine and a linear aliphatic dicarboxylic acid with 8 to 19 C atoms;

wherein the mol % values relate to the sum of I and II and wherein at most 20% of the hexamethylenediamine can be replaced by the equivalent quantity of another diamine and/or wherein at most 20% of the terephthalic acid can be replaced by the equivalent quantity of another aromatic dicarboxylic acid and/or 1,4-cyclohexanedicarboxylic acid and/or wherein at most 20% of the repeating units of hexamethylenediamine and linear aliphatic dicarboxylic acid can be replaced respectively by the equivalent number of units of a copolymerized lactam or ω-aminocarboxylic acid with 6 to 12 C atoms; and b) 40 to 1 parts by wt. of an olefinic copolymer comprising as polymerized monomer units:
 i) 35 to 94.9 wt. % of ethene-based monomer units,
 ii) 5 to 65 wt. % of monomer units based on a 1-alkene with 4 to 8 C atoms,
 iii) 0 to 10 wt. % of monomer units based on an olefin different from i) and ii), and
 iv) 0.1 to 2.5 wt. % of monomer units based on an aliphatically unsaturated dicarboxylic acid anhydride,
 wherein
 the sum of the wt. % values of i), ii), iii) and iv) is 100%, and
 the sum of the parts by wt. of a) and b) is 100.

In another embodiment the present invention includes a molded article comprising the moulding composition of the first embodiment. In further embodiments the present invention provides molded articles comprising the moulding composition of the first embodiment which are a monolayer pipe, a multilayer pipe a monolayer container or a multilayer container.

DETAILED DESCRIPTION OF THE PREFERRED EMBODIMENTS

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

According to the first embodiment of the present invention the moulding compound contains at least 40 wt. %, preferably at least 50 wt. %, particularly preferably at least 60 wt. %, especially preferably at least 70 wt. % and quite particularly preferably at least 80 wt. % of the following components:

a) 60 to 99 parts by wt., preferably 65 to 98 parts by wt., particularly preferably 68 to 97 parts by wt. and especially preferably 70 to 96 parts by wt. of a partially aromatic copolyamide which comprises monomer units which are derived from:

I. 30 to 90 mol %, preferably 40 to 85 mol %, particularly preferably 45 to 80 mol %, especially preferably 50 to 75 mol % and quite particularly preferably more than 50 to 70 mol % of a combination of hexamethylenediamine and terephthalic acid and II. 70 to 10 mol %, preferably 60 to 15 mol %, particularly preferably 55 to 20 mol %, especially preferably 50 to 25 mol % and quite particularly preferably less than 50 to 30 mol % of a combination of hexamethylenediamine and a linear aliphatic dicarboxylic acid with 8 to 19 C atoms, wherein the mol % values relate to the sum of I and II and wherein at most 20%, preferably at most 15%, particularly preferably at most 12%, especially preferably at most 8% and quite particularly preferably at most 5% or at most 4% respectively of the hexamethylenediamine can be replaced by the equivalent quantity of another diamine and/or wherein at most 20%, preferably at most 15%, particularly preferably at most 12%, especially preferably at most 8% and quite particularly preferably at most 5% or at most 4% respectively of the terephthalic acid can be replaced by the equivalent quantity of another aromatic dicarboxylic acid and/or 1,4-cyclohexanedicarboxylic acid and/or wherein at most 20%, preferably at most 15%, particularly preferably at most 12%, especially preferably at most 8% and quite particularly preferably at most 5% or at most 4% respectively of the repeating units of hexamethylenediamine and linear aliphatic dicarboxylic acid can be replaced by the equivalent quantity of units which are derived from a lactam or an ω-aminocarboxylic acid with 6 to 12 C atoms, b) 40 to 1 parts by wt., preferably 35 to 2 parts by wt., particularly preferably 32 to 3 parts by wt. and especially preferably 30 to 4 parts by wt. of an olefinic copolymer which contains the following monomer units:
 i) 35 to 94.9 wt. %, preferably 40 to 90 wt. % and particularly preferably 45 to 85 wt. % of ethene-based monomer units,
 ii) 5 to 65 wt. %, preferably 10 to 60 wt. % and particularly preferably 15 to 55 wt. % of monomer units based on a 1-alkene with 4 to 8 C atoms,
 iii) 0 to 10 wt. % of monomer units based on another olefin and
 iv) 0.1 to 2.5 wt. % of monomer units based on an aliphatically unsaturated dicarboxylic acid anhydride,
 wherein the individual contents are selected such that the sum of these wt. % values is 100, and wherein the sum of the parts by wt. of a) and b) is 100.

Suitable linear aliphatic dicarboxylic acid with 8 to 19 C atoms include the following compounds: Octanedioic acid (suberic acid; $C_8$), nonanedioic acid (azelaic acid; $C_9$), decanedioic acid (sebacic acid; $C_{10}$), undecanedioic acid ($C_{11}$), dodecanedioic acid ($C_{12}$), tridecanedioic acid ($C_{13}$), tetradecanedioic acid ($C_{14}$), pentadecanedioic acid ($C_{15}$), hexadecanedioic acid ($C_{16}$), heptadecanedioic acid ($C_{17}$), octadecanedioic acid ($C_{18}$) and nonadecanedioic acid ($C_{19}$).

According to the present invention, part of the hexamethylenediamine may optionally be replaced by another diamine. Examples of suitable diamines include but are not limited to the following compounds: 1,10-decanediamine, 1,12-dodecanediamine, m-xylylenediamine, p-xylylenediamine, bis-(4-aminocyclohexyl)-methane, 2-methyl-1,5-pentanediamine and 1,4-bis-aminomethyl-cyclohexane. Obviously, mixtures of such diamines may also be used. In one preferred embodiment the diamine consists of hexamethylenediamine, i.e., no other diamine is used.

According to the present invention, part of the terephthalic acid may optionally be replaced by another aromatic dicarboxylic acid or by 1,4-cyclohexanedicarboxylic acid. Suitable aromatic dicarboxylic acids include, but are not limited to the following dicarboxylic acids: Isophthalic acid, 4,4'-diphenyldicarboxylic acid, 4,4'-diphenyl ether dicarboxylic acid, 2,6-naphthalenedicarboxylic acid, 1,4-naphthalenedicarboxylic acid and 1,5-naphthalenedicarboxylic acid. Obviously, mixtures of such dicarboxylic acids may also be used. In a preferred embodiment the aromatic dicarboxylic acid consists of terephthalic acid, i.e., no other aromatic dicarboxylic acid and no 1,4-cyclohexanedicarboxylic acid is used.

Likewise, according to the present invention, part of the repeating units of hexamethylenediamine and linear aliphatic dicarboxylic acid may optionally be replaced by a lactam or an ω-aminocarboxylic acid with 6 to 12 C atoms. The repeating unit of hexamethylenediamine and linear aliphatic dicarboxylic acid is considered to correspond to a unit which is derived from a lactam or an ω-aminocarboxylic acid. Lactams or ω-aminocarboxylic acids with 6 to 12 C atoms include caprolactam, capryl lactam, undecanolactam, ω-aminoundecanoic acid, lauryl lactam and ω-aminododecanoic acid. In one preferred embodiment, the lactams or ω-aminocarboxylic acids have 11 or 12 C atoms.

The composition of the partially aromatic copolyamide may advantageously be selected such that its crystallite melting point $T_m$ according to ISO 11357, measured during the 2nd heating, lies in the range from 240 to 300° C., preferably in the range from 250 to 295° C. and particularly preferably in the range from 260 to 290° C. If several melting peaks occur, $T_m$ is determined from the main melting peak.

The copolyamide may be produced by melt polycondensation methods that are conventionally known in the art. Alternatively however, other known polyamide synthesis methods may be used.

A necessarily equimolar combination of hexamethylenediamine and terephthalic acid is present when it is ensured that these monomers can react in the mol ratio 1:1. However, due to the relative volatility of hexamethylenediamine losses can occur during the polycondensation, and these losses may be compensated by increasing the initial quantity of hexamethylene weighed into the reaction. It may moreover be necessary to deviate slightly from the exact stoichiometry of 1:1 in order to establish a defined end group ratio. The same logic applies in a) II. for the combination of hexamethylenediamine and a linear aliphatic dicarboxylic acid with 8 to 19 C atoms.

In a preferred embodiment, the ratio of the amino end groups to the sum of amino and carboxyl end groups in the partially aromatic polyamide is 0.3 to 0.7 and particularly preferably 0.35 to 0.65. The content of amino end groups may be adjusted by regulation of the polycondensation by methods which are known to those skilled in the art. The regulation can for example be effected by variation of the ratio of diamine used to dicarboxylic acid used by addition of a monocarboxylic acid or by addition of a monoamine. In addition, the content of amino end groups may be adjusted by mixing two copolyamides, one of which is rich in amino end groups and the other low in amino end groups, as granules or in the melt.

The amino group content can be determined by titration of a solution of the copolyamide in m-cresol with perchloric acid. The determination of the carboxyl group content can be effected by titration of a solution of the copolyamide in o-cresol with KOH in ethanol. These methods are conventionally known.

The 1-alkene with 4 to 8 C atoms of the olefinic copolymer includes but is not limited to the following compounds: 1-butene, 1-pentene, 1-hexene, 1-heptene and 1-octene. Obviously, the monomer units based on a 1-alkene with 4 to 8 C atoms can also be mixtures of these compounds.

The nature of the iii) other olefin the monomer units up to 0 to 10 wt. % optionally contained in the olefinic copolymer is not restricted. It may be an unconjugated diene, a monoene such as propene, 4-methylpentene-1 or styrene or a mixture thereof.

In an aspect of the first embodiment, the other olefin iii) is not an unconjugated diene.

In another aspect of the first embodiment the other olefin iii) is not styrene and/or not propene.

In one preferred embodiment of the present invention olefinic copolymer b) contains only i) monomer units which are derived from ethene, ii) a 1-alkene with 4 to 8 C atoms and iv) an aliphatically unsaturated dicarboxylic acid anhydride.

In one aspect, the 1-alkene with 4 to 8 C atoms is 1-butene.

In another aspect, the 1-alkene with 4 to 8 C atoms is 1-hexene.

In a further aspect, the 1-alkene with 4 to 8 C atoms is 1-octene.

These embodiments can be combined with one another without restriction.

The aliphatically unsaturated dicarboxylic acid anhydride iv) may be maleic anhydride, however other similar compounds such as for example aconitic anhydride, citraconic anhydride or itaconic anhydride may also be suitable.

The olefinic copolymer according to the present invention may be obtained by conventionally known methods, wherein the aliphatically unsaturated dicarboxylic acid anhydride or a precursor thereof, for example the corresponding acid or a half ester, is reacted with a preformed copolymer thermally or preferably by a radical reaction. The aliphatically unsaturated dicarboxylic acid anhydride may also be reacted in combination with other monomers, for example with dibutyl fumarate or styrene. Olefinic copolymers according to the present invention may include various commercially available types.

The olefinic copolymer is generally rubber-like, although it can also have a relatively high crystalline content. This is particularly to be seen with a higher content of monomer units which are derived from ethene, and with a not completely random distribution of the individual monomer units.

The moulding compound according to the invention, apart from the components a) and b), optionally contains further additives, which make up the balance to 100 wt. %, and preferably at least 0.01 wt. % thereof. These further additives include:

a) stabilizers, b) other polymers, c) fibrous reinforcing materials, d) fillers, e) plasticizers, f) pigments and/or colourants, g) flame retardants and h) processing aids.

In a preferred embodiment, the moulding compound contains an effective quantity of a copper-containing stabilizer. This is in particular a copper compound which is soluble in the polyamide matrix. The copper compound may be preferably combined with an alkali metal.

In certain embodiments, the stabilizer is a copper(I) salt, e.g. copper acetate, copper stearate, an organic copper complex such as for example copper acetylacetonate, a copper halide or the like in combination with an alkali metal halide.

In certain embodiments, the copper-containing stabilizer comprises a copper halide selected from copper iodide and copper bromide and an alkali metal halide selected from the iodides and bromides of lithium, sodium and potassium.

Preferably, the copper-containing stabilizer is metered in such a way that the moulding compound contains 20 to 2000 ppm of copper, particularly preferably 30 to 1500 ppm of copper and especially preferably 40 to 1000 ppm of copper.

In addition, it is preferred that the copper-containing stabilizer is constituted such that the weight ratio of alkali metal halide to copper compound lies in the range from 2.5 to 12 and particularly preferably in the range from 6 to 10. The combination of alkali metal halide and copper compound is generally contained in the moulding compound at about 0.01 wt. % to about 2.5 wt. %.

The copper-containing stabilizer offers protection against long-term thermal aging, for example in applications under the hood of an automobile.

In a further preferred embodiment, the moulding compound may contain an effective quantity of an oxidation stabilizer and particularly preferably an effective quantity of an oxidation stabilizer in combination with the effective quantity of a copper-containing stabilizer. Suitable oxidation stabilizers include aromatic amines, sterically hindered phenols, phosphites, phosphonites, thio synergists, hydroxylamines, benzofuranone derivatives, acryloyl modified phenols etc. Such oxidation stabilizers are commercially available in a large number of types, for example under the trade names Naugard 445, Irganox 1010, Irganox 1098, Irgafos 168, P-EPQ or Lowinox DSTDP. In general, the moulding compound contains about 0.01 to about 2 wt. % and preferably about 0.1 to about 1.5 wt. % of an oxidation stabilizer.

In addition, the moulding compound may also contain a UV stabilizer or a light stabilizer of the HALS type. Suitable UV stabilizers may preferably be organic UV absorbers including benzophenone derivatives, benzotriazole derivatives, oxalanilides or phenyltriazines. Light stabilizers of the HALS type are tetramethylpiperidine derivatives; these are inhibitors which act as radical scavengers. UV stabilizers and light stabilizers may advantageously be used in combination. Both are commercially available in a large number of types; as regards the dosage, the manufacturer's instructions can be followed.

The moulding compound may additionally contain a hydrolysis stabilizer such as for example a monomeric, oligomeric or polymeric carbodiimide or a bisoxazoline.

Other polymers which may be contained as an additive in the moulding compound are for example aliphatic polyamides, polyether amides, polytetrafluoroethylene (PTFE) or polyphenylene ethers.

Suitable aliphatic polyamides include PA46, PA66, PA68, PA610, PA612, PA613, PA410, PA412, PA810, PA1010, PA1012, PA1013, PA1014, PA1018, PA1212, PA6, PA11 and PA12 and copolyamides which are derived from these types. Preferably, the polyamide fraction of the moulding compound, which is composed of the partially aromatic copolyamide, optionally aliphatic polyamide and optionally polyether amide, contains less than 10 wt. %, particularly preferably less than 8 wt. %, especially preferably less than 5 wt. % and quite particularly preferably less than 3 wt. % of aliphatic polyamide or preferably less than 10 wt. %, particularly preferably less than 8 wt. %, especially preferably less than 5 wt. % and quite particularly preferably less than 3 wt. % of the sum of aliphatic polyamide and polyether amide.

Suitable polyphenylene ethers are produced by customary methods by oxidative coupling from phenols disubstituted in the ortho position by alkyl groups. A particularly preferable polyphenylene ether is poly(2,6-dimethyl-1,4-phenylene) ether, optionally in combination with 2,3,6-trimethylphenol units. As conventionally known, the polyphenylene ether may contain functional groups for bonding to the polyamide matrix; these functional groups may for example be introduced by treatment with maleic anhydride.

As the other polymer, preferably at most 4 wt. % and particularly preferably no polyhydroxy polymer selected from ethylene/vinyl alcohol copolymer and polyvinyl alcohol is contained in the moulding compound and particularly preferably at the same time also no aliphatic polyamide.

The moulding composition preferably contains at most 40 wt. %, particularly preferably at most 30 wt. % and especially preferably at most 25 wt. % of other polymers.

As fibrous reinforcing materials, glass fibres may be used. For this, short fibres (e.g. cut glass fibres with a length of 0.2-50 mm) or continuous fibres (rovings) may be used. The cross section of the glass fibres can be cruciform, but it can also be oval, elliptical, elliptical with constrictions (cocoon fibres), polygonal, rectangular or almost rectangular. Long fibre-reinforced moulding compounds can be produced by the known methods for production of long fibre-reinforced rod-shaped granules, in particular by pultrusion methods, in which the continuous fibre strand (roving) is completely impregnated with the polymer melt and then cooled and cut.

Other suitable fibrous reinforcing materials include carbon fibres, graphite fibres, silicon carbide fibres, boron fibres, aramid fibres, fibres of stainless steel or potassium titanate whiskers.

Suitable fillers include talc, mica, silicate, quartz, graphite, molybdenum disulphide, titanium dioxide, wollastonite, kaolin, amorphous silicic acids, magnesium carbonate, chalk, limestone, feldspar, barium sulphate, conductive carbon black, graphite fibrils, solid or hollow glass beads or ground glass.

The content of the fibrous reinforcing materials and the fillers in the moulding compound may be at most 60 wt. %, preferably at most 50 wt. % and preferably at least 0.1 wt. %.

Plasticizers and their use in polyamides are known. A general overview of plasticizers which are suitable for polyamides can be obtained from Gäehter/Müller, Kunststoffadditive (Plastics Additives), C. Hanser Verlag, 2nd Edition, p. 296.

Common compounds suitable as plasticizers include esters of p-hydroxybenzoic acid with 2 to 20 C atoms in the alcohol component or amides of arylsulphonic acids with 2 to 12 C atoms in the amine component, preferably amides of benzenesulphonic acid.

Plasticizers which are suitable include ethyl p-hydroxybenzoate, octyl p-hydroxybenzoate, i-hexadecyl p-hydroxybenzoate, toluenesulphonic acid n-octylamide, benzenesulphonic acid n-butylamide or benzenesulphonic acid 2-ethylhexylamide.

Suitable pigments and/or colourants include carbon black, iron oxide, zinc sulphide, ultramarine, nigrosin, pearlescent pigments and metal flakes.

Suitable flame retardants include antimony trioxide, hexabromocyclododecane, tetrabromobisphenol, borates, red phosphorus, magnesium hydroxide, aluminium hydroxide, melamine cyanurate and condensation products thereof such as melam, melem and melon; melamine compounds such as melamine pyro- and polyphosphate, ammonium polyphosphate and organophosphorus compounds or salts thereof such as for example resorcinol diphenyl phosphate, phosphonate esters or metal phosphinates.

Suitable processing aids include paraffins, fatty alcohols, fatty acid amides, stearates such as calcium stearate, paraffin waxes, montanates or polysiloxanes.

The moulding composition is produced from the individual components in a manner known to those skilled in the art by mixing in the melt.

The moulding composition according to the invention may be processed into moulded articles by injection moulding, extrusion or blow moulding. Examples of such moulded articles are casings and working parts for pumps, gears, valves and water meters, throttle valves, headlamp casings, reflectors, headlamp self-levelling systems, gearwheels, plug and socket connectors, connectors, profiles, films or layers of multilayer films, electronic components, housings for electronic components, tools, composite materials, plastic-rubber composites, connecting pieces and fittings for connecting hoses or pipes.

In particular single or multilayer hollow objects may be produced from the moulding composition according to the invention, above all pipes or vessels. These include for example charge air ducts for an automobile, mono- or multilayer fluid feed pipes, which can be smooth or corrugated, such as fuel pipes, hydraulic pipes, brake pipes, coupling lines or coolant pipes, brake fluid containers or fuel containers. Further applications are for example liners for rigid or flexible pipes in the oil or gas extraction industry, anti-wear tapes on flexible pipes for offshore extraction or pipes of umbilicals in which hot liquids are conveyed.

In multilayer films, multilayer pipes and multilayer containers, at least one layer consists of the moulding composition according to the invention bonded with at least one other layer which consists of another moulding composition. In case of inadequate layer adhesion, an intermediate adhesion promoter layer may be used.

The moulded articles of the moulding composition according to the invention can be used everywhere where high temperatures regularly prevail, without their impact resistance and their elongation at break deteriorating to a great extent.

EXAMPLES

In the examples, the following materials were used:
PA6T/612: see production example 1
AMODEL A-1006: a PA6T/6I/66 from Solvay Specialty Polymers containing about 65 mol % 6T, about 25 mol % 6I and about 10 mol % 66
PA10T/TMDT: see production example 2
Colour batch: mixture of 80 wt. % PA12 and 20 wt. % carbon black
TAFMER MH7010: an acid-modified ethylene-butylene rubber from Mitsui Chemicals
EXXELOR VA1803: an acid-modified ethylene-propylene rubber from ExxonMobil Chemical
Calcium stearate: processing aid
Polyad PB201 iodide: copper-containing stabilizer based on copper iodide and alkali metal halide
Naugard 445: oxidation stabilizer (aromatic amine)

Production Example 1 (PA6T/612 50:50; According to Invention):

12.621 kg of hexamethylenediamine, 9.021 kg of terephthalic acid, 13.356 kg of dodecanedioic acid, 15.000 kg distilled water and 3.53 g of a 50 weight percent aqueous solution of hypophosphorous acid were placed in a polycondensation reactor. The starting materials were melted at 180° C. and stirred for 3 hours at 225° C./22 bar. With continuous pressure release to 10 bar, the mixture was heated to 300° C. and pressure release again performed at this temperature. On attainment of 0.5 bar, the reactor was emptied and the product granulated. The granules were subjected to further condensation in a tumble dryer and thus brought up to the desired molecular weight.

Crystallite melting point $T_m$: 278° C. (main peak)

Production Example 2 (PA10T/TMDT 85:15; not According to Invention):

Production was performed with the equipment shown in FIG. 2 of U.S. Pat. No. 2,361,717, in which however the items 23, 24 and 25 were replaced by a high pressure-resistant autoclave which by means of an inert gas blanket ensured a constant feed pressure through the reactors. Both reactors were operated with an oil feed of 360° C.

24.70 kg of terephthalic acid, 21.775 kg of decamethylenediamine, 3.53 kg of a mixture of 2,2,4- and 2,4,4-trimethyl-hexamethylenediamine (TMD), 14.0 kg fully deionized water (DI water) and 10.0 g of a 50 weight percent aqueous solution of hypophosphorous acid were placed in the autoclave, inertized three times with nitrogen, and the autoclave sealed and heated at an oil feed temperature of 230° C. As a result, a clear homogeneous salt solution was formed. The autoclave was adjusted with nitrogen to constant 44 bar overall pressure; this pressure fed the material through the plant. The product obtained was further condensed in a tumble dryer and thus brought up to the desired molecular weight.

Crystallite melting point $T_m$: 285° C.

Production of the Moulding Compounds:

The moulding compounds were produced from the individual components by melt mixing in a kneading unit, discharged as strand, granulated and dried.

Next, test pieces were produced by injection moulding. One set of these test pieces was subjected to a tensile test according to ISO 527 in the freshly moulded state, one set after four hours' thermal aging at 180° C. in air and a further set after 295 hours' thermal aging at 180° C. in air. The composition and the test results are shown in Table 1.

After 4 hours at 180° C. no severe thermal aging is yet to be expected. The alteration in the measured values is here mainly attributable to post-crystallization of the samples.

In comparative examples 2 to 5, from the start neither yield stress nor yield strain could be measured. This is because of the only slight elongation at break.

The elongation at break in the freshly moulded state and after the post-crystallization was greatest in example 1 and in particular in comparative example 1. After thermal aging, the ratios here reversed; in example 1 42% of the original elongation at break was retained, while in comparative example 1 the elongation at break declined to only 13.7% of the original value.

The results showed that there is a combinatorial effect. This depends both on the selection of the correct partially aromatic polyamide and on the selection of the matching olefinic copolymer. This double selection was not previously known and was not expected based on conventional knowledge at the time of the present invention.

TABLE 1

Example 1 and comparative examples 1 to 5; Compositions and test results

|  | Unit | Example 1 | Comparative example 1 | Comparative example 2 | Comparative example 3 | Comparative example 4 | Comparative example 5 |
|---|---|---|---|---|---|---|---|
| PA6T/612 | parts by wt. | 65.38 | 65.38 | | | | |
| AMODEL A-1006 | parts by wt. | | | 65.38 | 65.38 | | |
| PA10T/TMDT | parts by wt. | | | | | 65.38 | 65.38 |
| Colour batch | parts by wt. | 2.5 | 2.5 | 2.5 | 2.5 | 2.5 | 2.5 |
| TAFMER MH7010 | parts by wt. | 30 | | 30 | | 30 | |
| EXXELOR VA1803 | parts by wt. | | 30 | | 30 | | 30 |
| Calcium stearate | parts by wt. | 0.32 | 0.32 | 0.32 | 0.32 | 0.32 | 0.32 |
| Polyad PB201 iodide | parts by wt. | 1.2 | 1.2 | 1.2 | 1.2 | 1.2 | 1.2 |

TABLE 1-continued

Example 1 and comparative examples 1 to 5; Compositions and test results

|  | Unit | Example 1 | Comparative example 1 | Comparative example 2 | Comparative example 3 | Comparative example 4 | Comparative example 5 |
|---|---|---|---|---|---|---|---|
| Naugard 445 | parts by wt. | 0.6 | 0.6 | 0.6 | 0.6 | 0.6 | 0.6 |
| Elastic modulus | MPa | 1260 | 1245 | 1493 | 1579 | 1352 | 1332 |
| Yield stress | MPa | 34.4 | 35.1 | — | — | — | — |
| Yield strain | % | 4.67 | 4.64 | — | — | — | — |
| Stress at break | MPa | 33.6 | 34.4 | 36.9 | 33.9 | 37.9 | 36.1 |
| Elongation at break | % | 58.23 | 87.99 | 5.16 | 3.29 | 5.82 | 5.27 |
| Elastic modulus (4 hrs/180° C.) | MPa | 1285 | 1294 | 1511 | 1562 | 1345 | 1408 |
| Yield stress (4 hrs/180° C.) | MPa | 35.7 | 36.4 | — | — | — | — |
| Yield strain (4 hrs/180° C.) | % | 5.65 | 4.96 | — | — | — | — |
| Stress at break (4 hrs/180° C.) | MPa | 36.1 | 37.1 | 36.9 | 34.4 | 38.6 | 31.6 |
| Elongation at break (4 hrs/180° C.) | % | 45.87 | 87.26 | 4.07 | 3.02 | 4.53 | 3.04 |
| Elastic modulus (295 hrs/180° C.) | MPa | 1298 | 1337 | 1526 | 1558 | 1390 | 1401 |
| Yield stress (295 hrs/180° C.) | MPa | 34.9 | 35.9 | — | — | — | — |
| Yield strain (295 hrs/180° C.) | % | 4.52 | 4.15 | — | — | — | — |
| Stress at break (295 hrs/180° C.) | MPa | 34 | 34.3 | 33.5 | 30.6 | 26.6 | 22.6 |
| Elongation at break (295 hrs/180° C.) | % | 24.35 | 12.09 | 3.16 | 2.35 | 2.29 | 1.96 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A moulding composition, comprising at least 40 wt. % of the following components:
   a) 60 to 99 parts by wt. of a partially aromatic copolyamide which comprises as polymerized monomer units:
      I. 40 to 90 mol % of a combination of hexamethylenediamine and terephthalic acid; and
      II. 60 to 10 mol % of a combination of hexamethylenediamine and a linear aliphatic dicarboxylic acid with 8 to 19 C atoms;
      wherein the mol % values relate to a sum of I and II and wherein at most 20% of hexamethylenediamine is optionally replaced by an equivalent quantity of another diamine and/or wherein at most 20% of terephthalic acid is optionally replaced by an equivalent quantity of another aromatic dicarboxylic acid and/or 1,4-cyclohexanedicarboxylic acid and/or Wherein at most 20% of the repeating units of hexamethylenediamine and the linear aliphatic dicarboxylic acid are optionally replaced respectively by an equivalent number of units of a copolymerized lactam or ω-aminocarboxylic acid with 6 to 12 C atoms; and
   b) 40 to 1 parts by wt. of an olefinic copolymer comprising as polymerized monomer units:
      i) 35 to 94.9 wt. % of ethene-based monomer units,
      ii) 5 to 65 wt. % of monomer units based on 1-butene,
      iii) 0 to 10 wt. % of monomer units based on an olefin different from i) and ii), and
      iv) 0.1 to 2.5 wt. % of monomer units based on an aliphatically unsaturated dicarboxylic acid anhydride,
   wherein a sum of the wt. % values of i), iii) and iv) is 100%,
   wherein a sum of the parts by wt. of a) and b) is 100, and
   wherein polyamide fraction of the moulding composition contains less than 3 wt. % of aliphatic polyamide.

2. The moulding composition according to claim 1, wherein a crystallite melting point $T_m$ of the copolyamide a) is from 240° C. to 300° C. as determined according to ISO 11357, measured during a 2nd heating stage.

3. The moulding composition according to claim 1, wherein a ratio of amino end groups to a sum of amino and carboxyl end groups of the partially aromatic copolyamide is from 0.3 to 0.7.

4. The moulding composition according to claim 1, wherein the olefinic copolymer b) comprises the monomer unit (iii), which does not comprise an unconjugated diene.

5. The moulding composition according to claim 1, wherein the olefinic copolymer b) comprises the monomer unit (iii), which does not comprise styrene or propene.

6. The moulding composition according to claim 1, wherein the olefinic copolymer b) consists of:
   i) 35 to 94.9 wt. % of the ethene-based monomer units,
   ii) 5 to 65 wt. % of the monomer units based on 1-butene, and
   iv) 0.1 to 2.5 wt. % of the monomer units based on an aliphatically unsaturated dicarboxylic acid anhydride.

7. The moulding composition according to claim 1, further comprising
   0.01 to 60 wt. % of an additive selected from the group consisting of a stabilizer, a polymer different from a) and b), a fibrous reinforcing material, a filler, a plasticizer, a pigment, a colorant, a flame retardant and a processing aid.

8. The moulding composition according to claim 7, wherein the moulding composition comprises a stabilizer which is a copper-containing stabilizer.

9. The moulding composition according to claim 8, wherein the copper-containing stabilizer is a copper(I) salt in combination with an alkali metal halide.

10. The moulding composition according to claim 9, wherein the copper(I) salt is selected from the group consisting of copper acetate, copper stearate, copper acetylacetonate, and a copper halide.

11. The moulding composition according to claim 9, wherein the alkali metal halide is selected from the group consisting of lithium iodide, sodium iodide, potassium iodide, lithium bromide, sodium bromide, and potassium bromide.

12. The moulding composition according to claim 8, wherein a copper content of the moulding composition is from 20 to 2000 ppm.

13. The moulding composition according to claim 7,
    wherein the moulding composition comprises a stabilizer which is an oxidation stabilizer.

14. A moulded article, comprising
    the moulding composition according to claim 1.

15. The moulded article according to claim 14, which is a monolayer pipe or a multilayer pipe.

16. The moulded article according to claim 14, which is a monolayer container or a multilayer container.

\* \* \* \* \*